United States Patent [19]

Nagasawa et al.

[11] Patent Number: 5,277,321

[45] Date of Patent: Jan. 11, 1994

[54] PAPER SHEET HANDLING APPARATUS

[75] Inventors: Tomoji Nagasawa, Yokohama; Koji Kurokawa, Sagamihara, both of Japan

[73] Assignee: Kabushiki Kaisha Toshiba, Kawasaki, Japan

[21] Appl. No.: 34,580

[22] Filed: Mar. 19, 1993

[30] Foreign Application Priority Data

Jun. 19, 1992 [JP] Japan .................................. 4-160960

[51] Int. Cl.$^5$ .............................................. B07C 5/00
[52] U.S. Cl. .................................. 209/583; 209/900; 271/305
[58] Field of Search ............. 209/552, 583, 584, 657, 209/900; 271/184, 185, 303, 305

[56] References Cited

U.S. PATENT DOCUMENTS

| | | | |
|---|---|---|---|
| 4,921,109 | 5/1990 | Hasuo et al. | 209/583 X |
| 5,048,694 | 9/1991 | Iwamoto | 209/900 X |
| 5,060,275 | 10/1991 | Hirano | 209/583 X |
| 5,112,042 | 5/1992 | Tilles et al. | 271/305 X |

FOREIGN PATENT DOCUMENTS 2233298 1/1991 United Kingdom ................. 209/900

Primary Examiner—Joseph E. Valenza
Assistant Examiner—Tuan N. Nguyen
Attorney, Agent, or Firm—Cushman, Darby & Cushman

[57] ABSTRACT

The group data and order data items of each of cards transferred one by one are read by a reader, and then stored in a memory under the control of a control circuit of a handling apparatus in which each card is sorted into that one of the regulating box groups which corresponds to the read group data and cards sorted into each box group are received one by one in a plurality of regulating boxes, and in which the memory stores the relation between the regulating boxes and order data items, a time table prestores data on a transfer time period corresponding to the distance between each regulating box and a discharge reference point of a corresponding exit transfer passage, and the discharge order of the cards is determined by the control circuit by use of the order data and transfer-time data, thereby to discharge cards, arranged in order, into collecting sections.

5 Claims, 10 Drawing Sheets

| REGULATING BOX | TIME PERIOD (TRAVELING TIME TO POINT Pa) |
|---|---|
| 23a | $t_0 + \frac{(n-1)W}{V}$ |
| 23b | $t_0 + \frac{(n-2)W}{V}$ |
| ⋮ | ⋮ |
| 23h | $t_0 + \frac{(n-h)W}{V}$ |
| ⋮ | ⋮ |
| 23m | $t_0 + \frac{(n-m)W}{V}$ |
| ⋮ | ⋮ |
| 23n-1 | $t_0 + \frac{W}{V}$ |
| 23n | $t_0$ |

FIG. 9

| REGULATING BOX NO. | CARD NO. | TIME IN TIMER | EXTRACTION TIME |
|---|---|---|---|
| 1 (23a) | 05 | T1 = (-3) | T1+T3+T4+T2+T5 = (-3)+(0)+(+2)+(-1)+(+4) ⟹ 2 |
| 2 (23b) | 03 | T2 = (-1) | T2+T3+T4 = (-1)+(0)+(+2) ⟹ 1 |
| 3 (23c) | 01 | T3 = (0) | START ⟹ 0 |
| 4 (23d) | 02 | T4 = (+2) | T4+T3 = (+2)+(0) ⟹ 2 |
| 5 (23e) | 04 | T5 = (+4) | T5+T3+T4+T2 = (+4)+(0)+(+2)+(-1) ⟹ 5 |

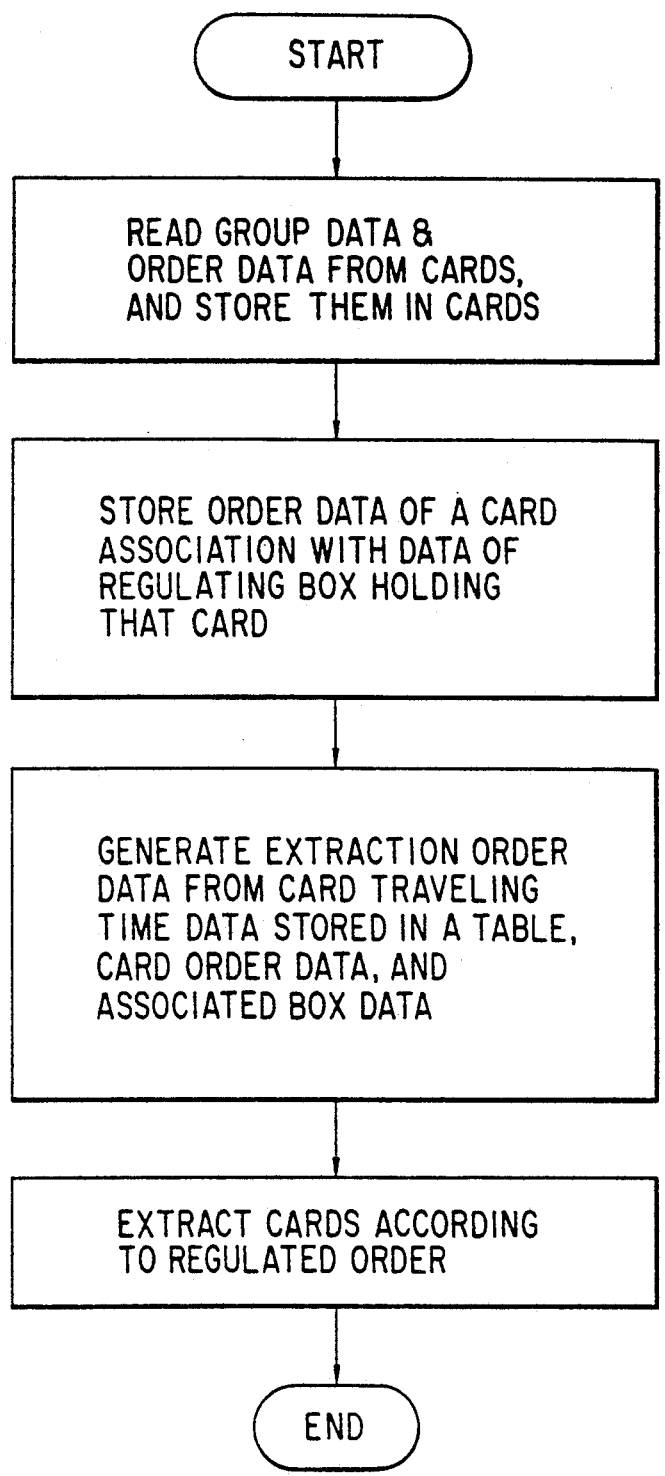
F I G. 10

PAPER SHEET HANDLING APPARATUS

BACKGROUND OF THE INVENTION

1. Field of the Invention

This invention relates to a paper sheet handling apparatus capable of sorting paper sheets such as cards into groups, and arranging the sheets in order in each group.

2. Description of the Related Art

In the case of handling so many paper sheets, it has been requested to sort paper sheets, supplied at random, into several groups in accordance with the kinds thereof, and to arrange sheets in order in each group.

For example, in the case of delivering items of mail in each delivery area, the reasonable delivery route does not necessarily correspond to the order of the address numbers in the delivery area. Thus, a device is requested, which can sort items of mail into groups corresponding to delivery areas and arrange them in each group to accord with a predetermined delivery order.

A card Card sorting apparatus of this type is disclosed in Published Examined Japanese Patent Application No. 56-42010.

In the apparatus disclosed in this publication, the classification number of a latter card discharged from a single card container is read and compared with a number of a former card previously discharged and data stored in a storing section, to detect whether the latter card is to be located in front of the stored former card. If this is the case, the latter card is passed to another container. If the latter card is detected not to be passed, the former card stored in the storing section is taken out and sent to the another container. In this case, the latter card is now stored in the storing section. Such operation is repeated to arrange the overall cards in order.

Generally, cards may well be injured when they are conveyed, discharged from, or stocked into a container. In consideration of this, the above-mentioned apparatus is disadvantageous since cards must be discharged a number of times corresponding to the number of the total cards, at least twice. If ten cards are arranged in order by means of the method employed in the publication, it is necessary to discharge cards nine times in the most case. The larger the number of the cards, the larger number of times the cards must be discharged, and accordingly the more time is required.

Moreover, the size of a container is limited physically, and accordingly, the number of cards which can be handled at a time is limited.

If a large number of cards are handled in the above apparatus, then it is necessary to employ a sorter at a location upstream of the apparatus in order to sort the cards into groups. In this case, the cards are handled at least one time more than in the case where an apparatus has no sorter. Further, moving the cards between the apparatus and sorter involves additional time and labor.

SUMMARY OF THE INVENTION

It is the object of the invention to provide a paper sheet handling apparatus for handling paper sheets each having data indicative of a predetermined group and data indicative of the turn of the sheet in the group, which can prevent damage of the sheets and efficiently arrange them in order in each group in a short time, by reducing the number of discharge occasions or so.

According to one aspect of the invention, there is provided a paper-sheet handling apparatus for handling paper sheets each of which has group data indicative of a group to which the sheet belongs, and order data relating to the turn of the sheet in the group, comprising: supply means for supplying the sheets one by one; transfer means for transferring the paper sheets supplied by the supply means one by one; reading means for reading the group data and order data of each sheet transferred by the transfer means; a plurality of regulating box groups arranged in parallel with the transfer means, each of the regulating box groups having a plurality of regulating boxes; sorting means for sorting each of the paper sheets transferred by the transfer means, into that one of the regulating box groups which corresponds to the group data read by the reading means; delivery means provided at each regulating box group, for one-by-one delivering the paper sheets sorted by the sorting means, into the regulating boxes; discharge means, for discharging the paper sheets received in the regulating boxes, in accordance with the relative positions of the paper sheets and the order data items read by the reading means; and a plurality of collecting means each for collecting the paper sheets, discharged by the discharge means from a corresponding regulating box group, in an order determined by the order data in the regulating box group.

In the invention constructed as above, the paper sheets are transferred by transfer means, and the data of each card thus transferred is read by reading means. Successively, each card is sorted into that one of the regulating box groups which corresponds to the read group data. Cards sorted into each box group are received one by one in a plurality of regulating boxes. Then, the cards are discharged from the regulating boxes of each regulating box group in an order determined based on the read order data, and then collected in the order in each group.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 9 is a view, useful in explaining how to calculate a discharge time period necessary at each regulating box when mail items are rearranged; and FIG. 10 is a flowchart, useful in explaining operation of a controller shown in FIG. 4.

DETAILED DESCRIPTION OF THE PREFERRED EMBODIMENTS

An embodiment of the invention will be explained with reference to the accompanying drawings.

Figure 1:
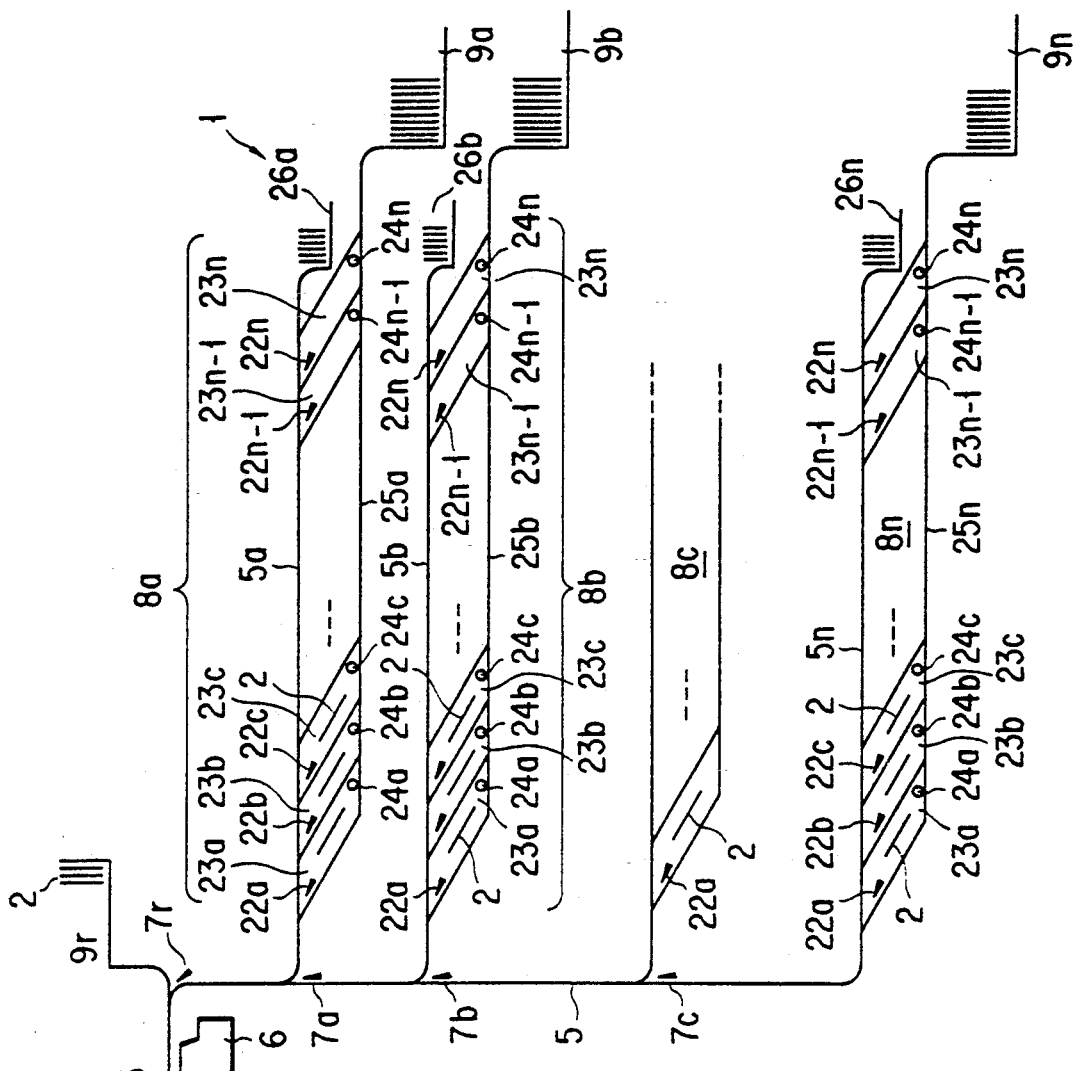
FIG. 1 is a schematic view, showing the overall structure of a mail handling apparatus according to an embodiment of the invention.

FIG. 1 is a schematic view, showing the overall structure of a mail handling apparatus 1 as a paper sheet-handling apparatus of the invention.

The mail handling apparatus 1 sorts a great number of mail items 2 into groups (large divisions) corresponding to delivery areas, and arranges the mail items 2 in orders predetermined in the groups, respectively.

Specifically, the apparatus 1 comprises: a supply section 3 for receiving a great number of mail items 2 to be handled; a one-by-one feeding section 4 for discharging the mail items 2 one by one from the supply section 3 at regular intervals; a transfer passage 5 for transferring the discharged mail items 2 at a constant speed; a reading section 6 for reading the mail number and/or address of each mail item being transferred along the passage 5; a sorting gate 7r for sorting those of the mail items 2 which are to be rejected; sorting gates 7a, 7b, ..., 7n located downstream of the gate 7r for sorting the mail items 2 into groups corresponding to delivery areas; sub-transfer passages 5a, 5b, ..., 5n diverging from the transfer passage 5 for transferring the mail items 2 sorted by the sorting gates 7a, 7b, 7n; regulating box groups 8a, 8b, ..., 8n for receiving the mail items 2 one by one from the passages 5, 5a, 5b, ..., 5n; collecting sections 9a, 9b, ..., 9n for collecting those of the mail items 2 which have been discharged from the box groups, 8a, 8b, ..., 8n; overflown-item collecting sections 26a, 26b, ..., 26n for collecting those of the mail items 2 which cannot be received in the box groups 8a, 8b, ..., 8n; and a rejected-item collecting section 9r for collecting those of the mail items 2 which are rejected by the sorting gate 7r.

The supply section 3 can receive a great number of mail items 2, and has a sensor 11 for sensing whether or not a mail item exists.

The regulating box group 8a has the sub-transfer passage 5a for transferring the mail items 2 sorted by the sorting gate 7a; delivery gates 22a, 22b, ..., 22n for successively picking up the mail items 2 transferred along the sub-transfer passage 5a; regulating boxes 23a, 23b, ..., 23n for collecting the mail items 2 sorted by the sorting gates 23a, 23b, ..., 23n one by one; discharging members 24a, 24b, ..., 24n for discharging the mail items 2 collected in the boxes 23a, 23b, ..., 23n; an exit transfer passage 25a for transferring the mail items 2 from the discharging members 24a, 24b, ..., 24n, to the collecting section 9a; and an overflown-item collecting section 26a for collecting mail items overflown and transferred along the sub-transfer passage 5a.

The other regulating box groups 8b, ..., 8n have the same structure, and hence explanation thereof is omitted.

Figure 2:
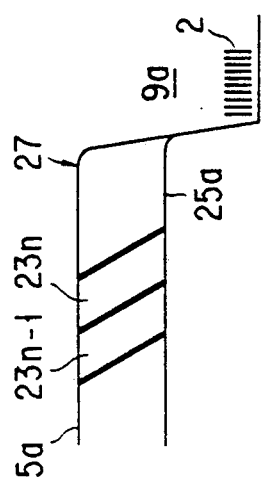
FIG. 2 shows a structure obtained when entrance and exit transfer passages shown in FIG. 1 are directly connected to each other.

As is shown in FIG. 2, a connecting transfer passage 27 may be provided in place of the overflown-item collecting sections 26a, 26b, ..., 26n, which connects the end of the sub-transfer passage 5 to the exit transfer passage 25a to guide mail items, overflown and transferred along the sub-transfer passage 5a, to the collecting section 9a.

After all the mail items are discharged from the supply section 3, the mail items collected in the overflow-item collecting sections 26a, ..., 26n may be manually taken out therefrom and inserted again into the supply section 3 (when the number of the overflown mail items is not so large), or may be handled in the next handling cycle (when the number of them is large). The mail items collected in the sections 26a–26n include those items which are not sorted into the regulating box groups 8a–8n though the boxes are not fully received the items.

Since the number of the regulating boxes 23a, ..., 23n to be employed in the regulating box group 8a corresponding to a given delivery area can be estimated statistically, there will exist few occasions in which mail items are overflown, if a prescribed number of regulating boxes than the estimated number are employed. In this case, it is not necessary to provide a large number of boxes corresponding to the all households in the given delivery area. The same can be said of the other regulating box groups 8b, ..., 8n.

Further, to deal with even a case where the number of mail items to be delivered to one area is larger than usual and hence they may overflow a corresponding regulating box group, it is convenient to employ a larger number of the regulating box groups 8a, ..., 8n (which can be referred also to as "line number") than the number of the overall delivery areas. In this case, for example, the sorting gates 7a and 7b shown in FIG. 1 are controlled so as to cause the two lines 8a and 8b to handle mail items to be delivered to one area. This means that those of the mail items which may overflow are handled by a spare line (line 8b, for example).

Figure 3A:
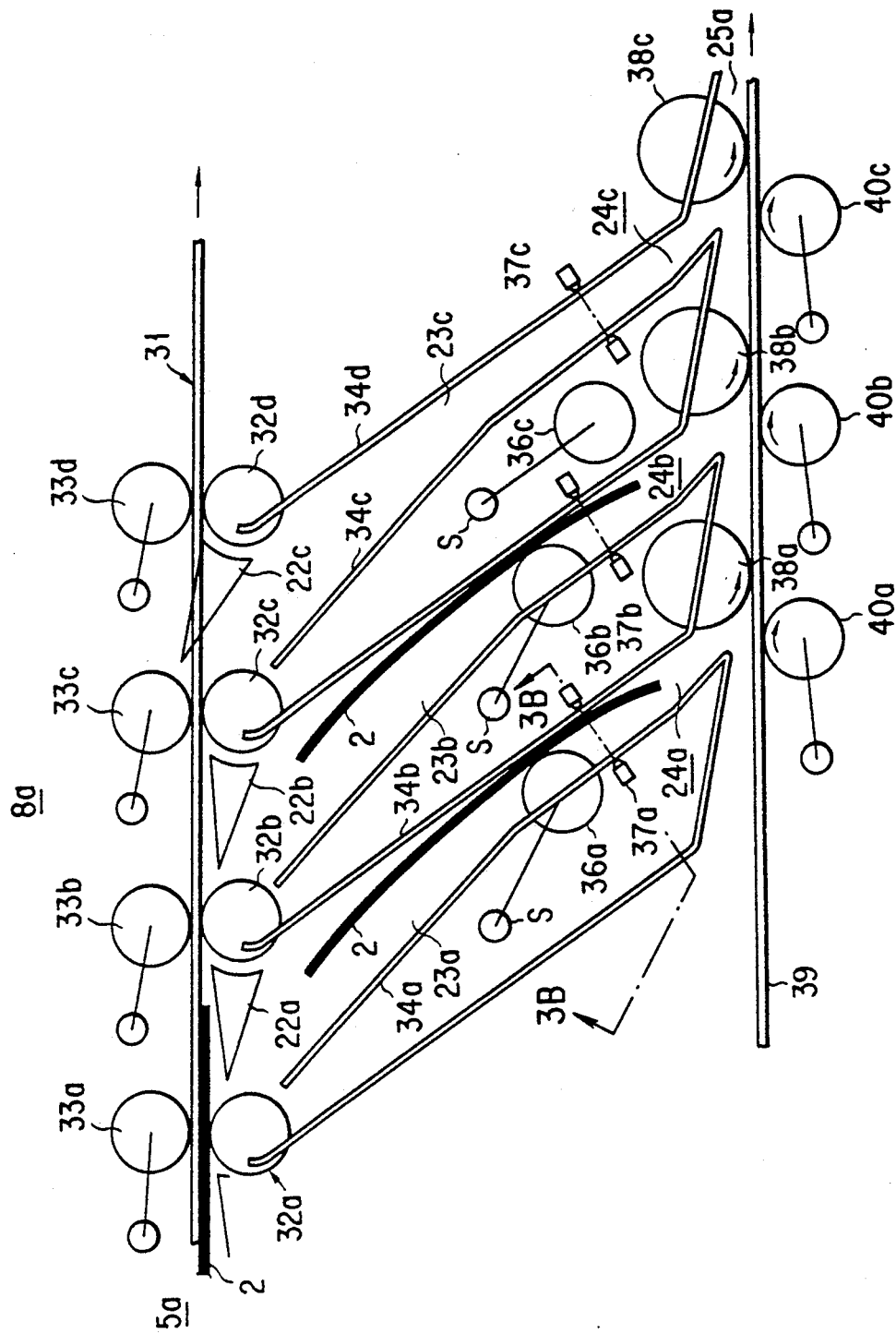
FIG. 3A is a plan view, useful in explaining in detail the structure of one regulating box group shown in FIG. 1.
Figure 3B:
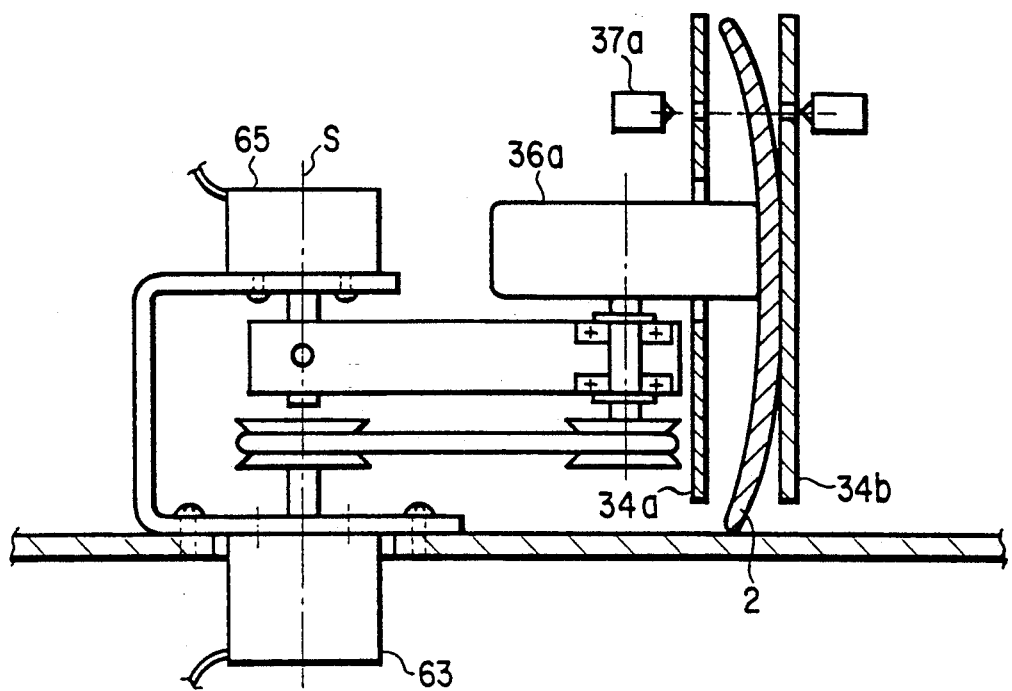
FIG. 3B is a sectional view of the regulating box group viewed from a line 3B—3B in FIG. 3A.

The regulating box group 8a is constructed as shown in FIGS. 3A and 3B (in which only three boxes 23a, 23b, and 23c are shown for the sake of simplicity). That is, the sub-transfer passage 5a comprises a transfer belt 31, driving rollers 32a, 32b, 32c, and 32d, and pinch rollers 33a, 33b, 33c, and 33d. The mail items 2 are transferred while they are held between the transfer belt 31 and the driving rollers 32a–32d. The transfer belt 31 is pressed by the pinch rollers 33a–33d against the driving rollers 32a–32d, thereby preventing lifting of the mail items transferred along the sub-transfer passage 5a.

The sorting gates 22a, 22b, and 22c are interposed between each adjacent pair of the driving rollers 32a–32d. Each sorting gate has an upper surface used as a guide member of the sub-transfer passage 5a, and a lower surface used, when the gate is operated, as a guide member for guiding the mail items 2, transferred along the sub-transfer passage 5a, into the regulating boxes 23a, 23b, and 23c located below. In FIG. 3A, the gates 22a and 22b are in the inoperative state, and the gate 22c is in the operative state.

The regulating boxes 23a–23c are located from the upstream side of the sub-transfer passage 5a to the downstream of the same. The sorting gates 22a–22c are driven one by one to thereby put mail items one by one into the boxes 23a-23c. If the mail items 2 are discharged from the supply section 3 at regular intervals and the transfer belt 31 runs at a constant speed, they can be received in the regulating boxes 23a-23c one by one only by operating the gates 22a-22c at regular intervals, without complicated timing control.

As is shown in FIGS. 3A, 3B, the regulating box 23a has a guide plate 34a, a pinch driving roller 36a, and a sensor 37a. The mail item 2 sorted by the sorting gate 22a is downwardly guided in the box 23a between one surface of the guide plate 34a and that surface of a guide plate 34b of the adjacent regulating box 23b, which faces the guide plate 34a. When a tip portion of the item 2 is sensed by the sensor 37a, it is pressed against the guide plate 34b by the pinch driving roller 36a. The other regulating boxes 23b and 23c have the same structure.

The discharging member 24a of the box 23a comprises the pinch driving roller 36a, and a driving roller 38a for rotating on the exit transfer passage 25a, as is shown in FIG. 3A. In accordance with rotation of the pinch driving roller 36a, the tip portion of the mail item 2 is downwardly guided toward the exit of the box 23a, and is guided by the driving roller 38 to the exit transfer passage 25a.

The exit transfer passage 25a comprises driving rollers 38a-38c corresponding to the regulating boxes 34a-34c, and a transfer belt 39, as is shown in FIG. 3A. The mail item 2 is transferred by use of the driving rollers 38a-38c and transfer belt 39. The transfer belt 39 is pressed against the driving rollers 38a, 38b, and 38c by means of the pinch rollers 40a, 40b, and 40c to thereby prevent lifting of the mail item 2 transferred along the exit transfer passage 25a.

In the above structure, the mail item 2 first sorted by the sorting gate 7a is transferred along the sub-transfer passage 5a comprising the transfer belt 31 and driving rollers 32a, ..., 32d. At this time, the sorting gate 22a is rotated upward on the passage 5a, thereby closing the same. Accordingly, the mail item 2 is sorted downward by the sorting gate 22a, and guided in the regulating box 23a between the guide plates 34a and 34b. When a tip portion of the mail item 2 is sensed by the sensor 37a, the pinch driving roller 36a is rotated counterclockwise about a fulcrum S, thereby pressing the tip portion against the guide plate 34b (in a state where the rotation of the roller 36a is stopped). Thus, the first mail item in the regulating box group 8a is received in the regulating box 23a.

Thereafter, the mail items 2 sorted by the sorting gate 7a into the box group 8a are successively received in the arrangement boxes 23b, ..., 23n.

Similarly, the mail items 2 sorted by the sorting gates 7b, ..., 7n are received one by one in the regulating boxes 23a, ..., 23n of the regulating box groups 8b, ..., 8n, respectively.

In accordance with rotation of the pinch driving rollers 36a, ..., 36n, the mail items 2 collected in the boxes 23a, ..., 23n of each regulating box group are guided by the guide plates 34a, ..., 34n into each exit transfer passage (25a, ..., 25n) located between the driving rollers 38a, ..., 38n and the transfer belt 39. The mail items 2 are guided via the exit transfer passages 25a, ..., 25n into the collecting sections 9a, ..., 9n.

When the mail item is discharged from e.g. the regulating box 23a, i.e., when a rear end portion of the item is sensed by the sensor 37a, the pinch driving roller 36a stops rotating and moves clockwise to the original position.

Figure 4:
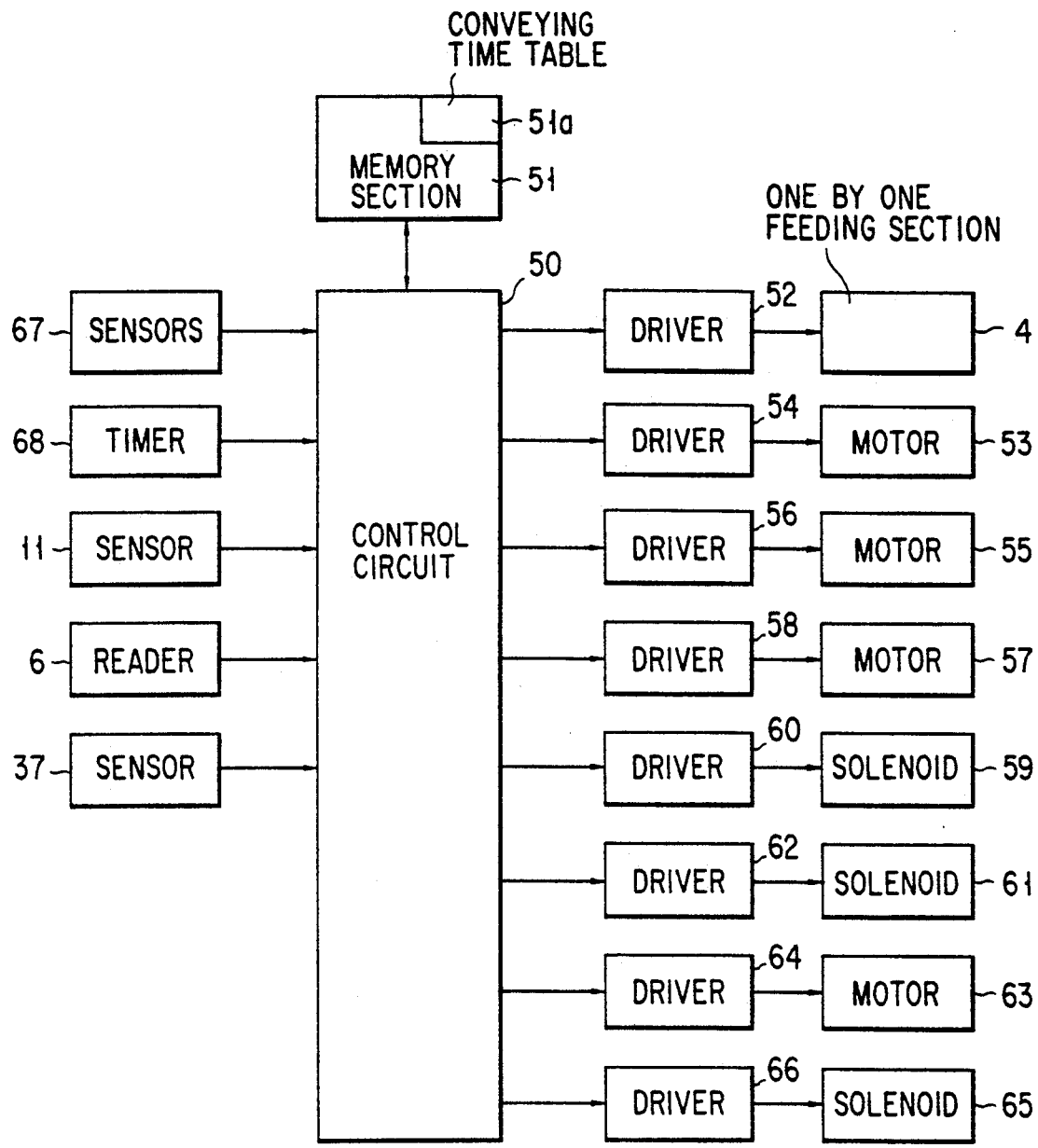
FIG. 4 is a block diagram, showing a control system for controlling the overall mail handling apparatus of FIG. 1.

Then, a control system for controlling the overall handling apparatus will now be explained with reference to FIG. 4.

A control circuit 50 is provided for controlling the overall apparatus. The circuit 50 has a memory section 51 storing various data items and control programs; a driver 52 for driving the one-by-one feeding section 4; a driver 54 for driving a motor 53 driving the transfer passage 5; a driver 56 for driving a motor 55 for rotating the driving rollers 32a, ..., 32n of the sub-transfer passages 5a, ..., 5n in the regulating box groups 8a, ..., 8n; a driver 58 for driving a motor 57 for rotating the driving rollers 38a, ..., 38n of the exit transfer passages 25a, ..., 25n in the regulating box groups 8a, ..., 8n; a driver 60 for driving a solenoid 59 for rotating the sorting gates 7a, ..., 7n; a driver 62 for driving a solenoid 61 for rotating the sorting gates 22a, ..., 22n in the groups 8a, ..., 8n; a driver 64 for driving a motor 63 such as a self-holding motor or brake motor for rotating the pinch driving rollers 36a, ..., 36n provided in the regulating boxes 23a, ..., 23n of each of the regulating box groups 8a, ..., 8n; a driver 66 for driving a solenoid 65 for moving the pinch driving rollers 36a, ..., 36n; a sensor group 67 for sensing transfer of the mail items 2 along the exit transfer passages 25a, ..., 25n; a timer 68 for counting a time period; the sensor 11 of the supply section 3; the reading section 6; and the sensors 37 provided in the regulating boxes 23a, ..., 23n of each regulating box group 8a, ..., 8n.

The memory section 51 has a traveling or conveying time table 51a for storing time periods required to travel from the regulating boxes 23a, ..., 23n in each regulating box group 8a, ..., 8n to a predetermined position of the exit transfer passages 25a, ..., 25n, respectively.

Figure 5:
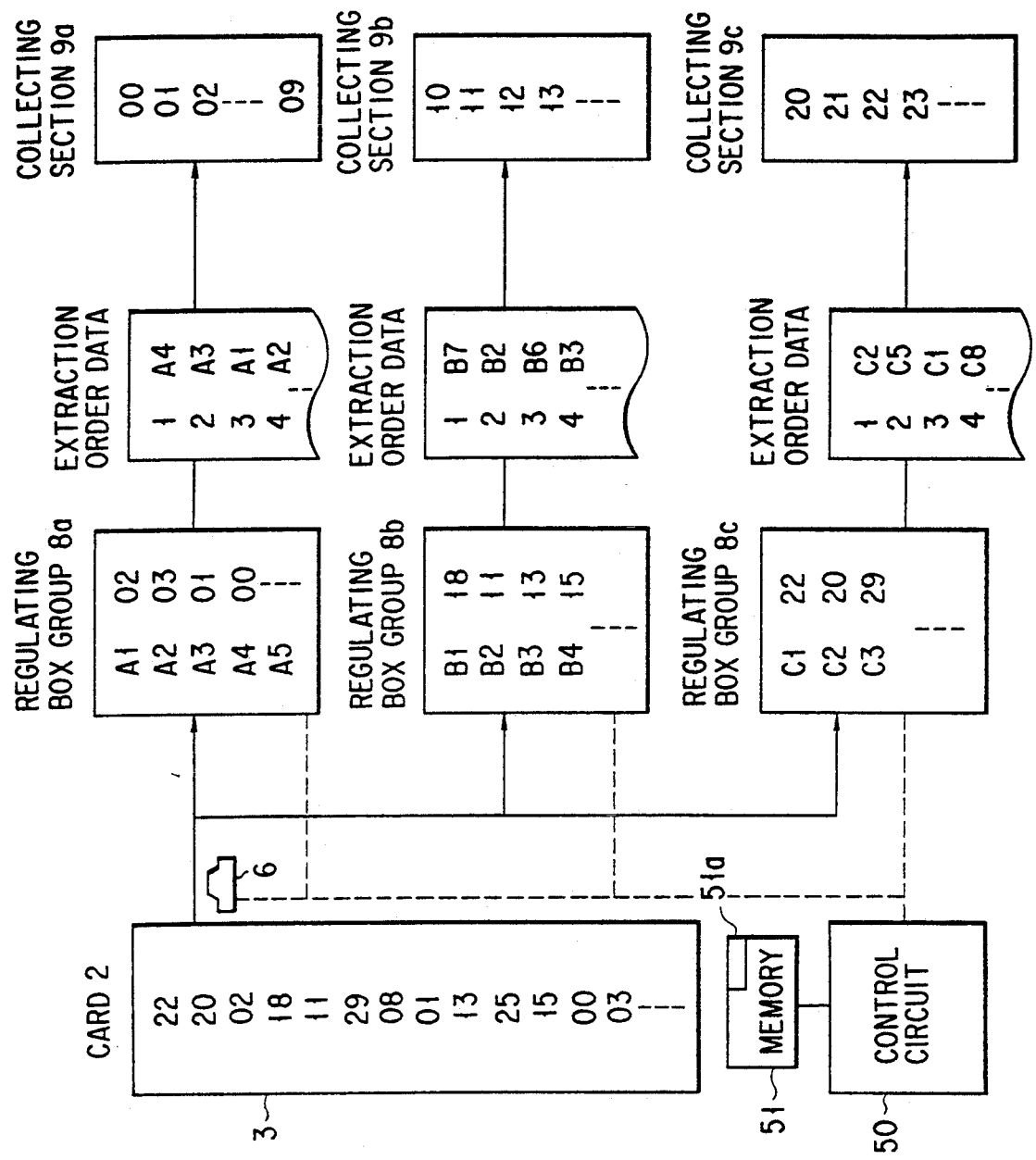
FIG. 5 is a view, useful in explaining rearrangement of items of mail in each group.

Then, rearrangement of cards 2 according to the invention will be explained with reference to FIG. 5.

Suppose that thirty cards numbers 00-29 are sorted into three groups (a first group consisting of cards number 00-09, a second group consisting of cards numbers 10-19, and a third group consisting of card numbers 20-29), and rearrangement is performed in each group.

First, the number of the card 2 fed by the one-by-one feeder 4 from the supply section 3 and transferred along the transfer passage 5 is read by the reading section 6. A card having a number falling within 00-09 is guided to the regulating box group 8a, that having a number falling within 10-19 into the regulating box group 8b, and that having a number falling within 20-29 to the regulating box group 8c. The cards guided into each box group 8a-8c are received one by one in the boxes 23a, ..., 23n. At this time, under the control of the control circuit 50, the memory section 51 stores data as regards which card is received in which box.

For example, thirty cards are set at a time in the supply section 3, with a card of number 22 placed at the top. The card number 22 is taken first and read by the reading section 6. The control circuit 50 compares number 22 with data prestored in the memory section 51, thereby judging that the card should be guided to the regulating box group 8c, and driving the sorting gate 7c and the first gate 22a of the group 8c to guide the same into the regulating box 23a. Simultaneously, the circuit 50 causes the memory section 51 to store data C1 indicative of the first regulating box 23a, and data indicative of number 22 in a memory area corresponding to the group 8c.

If the next card has number 20, it is supplied into the second box 23b of the regulating box group 8c, and data C2 indicative of the second box 23b and data indicative of number 20 are stored in the above memory area. If the third card has number 02, it is supplied into the first box 23a of the regulating box group 8a, and data indicative of the first box 23a and data indicative of number 02 are stored in a memory area A1, and 02 of the memory section 51 corresponding to the group 8a. Similarly, the remaining cards are sorted into the regulating box groups 8a-8c.

Then, if the sensor 11 does not sense any card for a predetermined time period, the control circuits determines that the supply of cards has been completed or an operator instructs the completion of the card supply, and creates discharge data for discharging the cards from the regulating box groups 8a-8c, and rearranging them based on the data prestored in the memory section 51 In accordance with the discharge data, the cards are discharged one by one from the regulating boxes 23a,..., 23n of the regulating box groups 8a-8c by use of the discharging members 24a, ..., 24n, respectively, and are supplied into the collecting sections 9a-9c via the exit transfer passages 25a-25c, thus arranging the cards in order.

Specifically, the cards sorted into the regulating boxes 23a, ..., 23n of the regulating box group 8a are arranged at random, for example, in the order of 02, 03, 01, 00 ... To rearrange the cards in the collecting section 9a in the serial order of 00, 01, 02, 03, ..., first, data A4 corresponding to the fourth regulating box 23d containing the card number 00 is searched by use of the number data of the card. Then, the discharging member 24d is driven to discharge the card number 00 to the exit transfer passage 25a. Subsequently, data A3 corresponding to the third regulating box 23c is obtained as a result of searching using the number data of a card number 01, thereby driving the discharging member 24c to discharge the card number 01. Since the cards numbers 00 and 01 are arranged adjacent to each other in the forward direction of the exit transfer passage 25a, the discharging members 24d and 24c may be driven either successively or simultaneously. Similarly, since the card number 02 is contained in the box 23a located upstream of the box containing the card number 01, the discharging member 24a may be driven at the same time as the members 24d and 24c. Further, since the fourth card number 03 is contained in the second box 23b, data A2 corresponding thereto is stored in a fourth memory area. It is desirable to discharge the card number 03 immediately after the card number 02 discharged from the first box 23a passes the second box 23b containing the card number 03. That is, to discharge the overall cards most efficiently in a shortest time period in accordance with the order of the cards received in the boxes 23a, ..., 23n, the timing of discharge must be controlled in consideration of the order in which the cards are received, and of a time period required to transfer each card to a predetermined position of the exit transfer passage. This timing control will be explained in detail later.

Discharge control may be performed first in the regulating box group 8a by use of a single processor, and then performed successively in the other groups 8b,..., 8n by use of the same processor. Alternatively, discharge control may be performed simultaneously in all the groups 8a, ..., 8n by use of a number of processors corresponding to that of the groups.

Now, rearrangement of cards 2 received in the boxes 23a, .., 23n of e.g. the group 8a will be explained in detail.

Figures 6, 7:
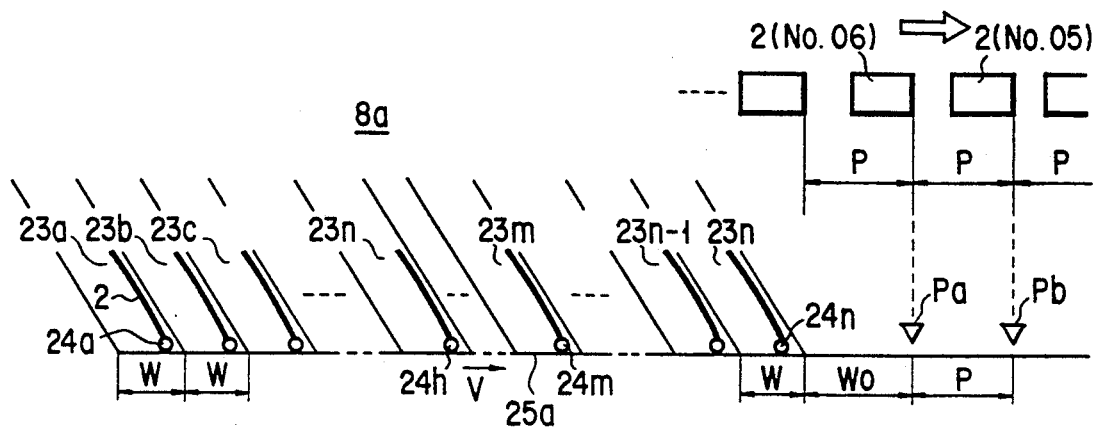
FIG. 6 is a view, useful in explaining mail-rearrangement control performed in one group.
FIG. 7 shows an example of data items stored in a moving-time table shown in FIG. 4.

Suppose that the regulating boxes 23a, ..., 23n are arranged with a pitch of W, as is shown in FIG. 6, and that passing points Pa and Pb are set downstream of the last regulating box 23n along the exit transfer passage 25a such that the distance between the box 23n and the point Pa and the distance between the points Pa and Pb are set to Wo and P, respectively. The speed of transfer along the passage 25a is set to V [m/s].

In the case of performing constant-pitch transfer, to enhance the handling efficiency as much as possible, it is necessary to transfer cards 2, discharged in a predetermined order, with a predetermined pitch of P, as shown in FIG. 6. The handling capacity S of the apparatus per unit hour, one hour, for example, is given by:

$$S = (3600V/P) \text{ [sheets/one hour]}$$

However, since the distances between the point Pa and the boxes 23a,..., 23n differ from one another, the collecting order will be quite different from a predetermined order if cards are discharged simply in the predetermined order. For example, where a card number 00 and a card number 01 are received in the first and last boxes 23a and 23n, respectively, even if the card number 01 is discharged after the card number 00 is discharged, correct arrangement will not be made when the former is discharged before the latter passes the box 23n. To avoid this, the following method is employed.

First, a time period required to convey the card 2 from each of the regulating boxes 23a, ..., 23n and then lead the front end thereof to the point Pa is stored as a timer value (time period) in the traveling period table 51a of the memory section 51.

As is shown in FIG. 7, the table 51a stores
"to+(n−1) W/V" for the first regulating box 23a,
"to+(n−2) W/V" for the second regulating box 23b,
...,
"to+(n−h) W/V" for the h-th regulating box 23h,
"to+(n−m) W/V" for the m-th regulating box 23m,
"to+W/V" for the (n−1)th regulating box 23n−1, and
"to" for the n-th regulating box 23n.

The transfer speed of a card is set to V [m/s], the handling capacity S=3600 V/P [sheets/H], the regulating box pitch to W [m], the card-transfer pitch to P [m], the distance between the last box 23n and the point Pa to Wo [m][fixed value], and to=Wo/V [sec].

If a card number 05 is received in a box 23h and a card number 06 in a box 23m, it is calculated when the card should be discharged from the box 23m after the card is discharged from the box 23h, so that the cards can be transferred in order with a constant pitch of P.

The front end of the card number 05 discharged from the box 23h reaches the point Pb after a time period of {to+(n−h) W/V+(P/V)} elapses. Assuming that the card number 06 should be discharged from the box 23m "Tm" seconds after the card number 05 is discharged from the box 23h, the time period required to lead the front end of the card discharged from the box 23m to the point Pa is {Tm+to+(n−m) W/V}. "Tm" is a set time period after which each card is discharged.

In other words, {to+(n−h) W/V+(P/V)} must be equal to {Tm+to+(n−m) W/V}.

Accordingly, the discharge time period Tm is given by $$Tm = \{P+(m-h)W\}/V \qquad (1)$$

where P, W, and V represent constant values.

Thus, Tm is determined by the positions of the boxes $23h$ and $23m$, so that the discharge set time period T is determined depending upon a desired order in which cards are discharged. Accordingly, all the discharge time points are determined in accordance with all the set time periods T.

For example, as is shown in Fig. 8, explanation will be made as regards a case where five cards numbers 01-05 received in the boxes $23a$, ..., $23e$ in the group $8a$ are rearranged in the order of the boxes $23c$, $23d$, $23b$, $23e$, and $23a$. For easy understanding, suppose that V=P [m/s], W=P [m], and Wo=P [m].

In this case, the following is obtained from equation (1):

$$\begin{aligned} Tm &= \{P + (m - h)W\}/V \\ &= \{P + (m - h)P\}/P \\ &= 1 + (m - h) \end{aligned}$$

When a set time period T3 corresponding to the box $23c$ containing the top card number 01 is zero, a set time period T4 corresponding to the box $23d$ is $1+(4-3)=2$, a set time period T2 corresponding to the box $23b$ is $1+(2-4)=-1$, a set time period T5 corresponding to the box $23e$ is $1+(5-2)=4$, and a set time period T1 corresponding to the box $23a$ is $1+(1-5)=-3$.

The discharge time point of a card received in each of the boxes $23a$, ..., $23n$ is calculated from a corresponding time period and a discharge order corresponding to the number of the card. The card in the box $23a$ is discharged in consideration of the discharge order of the cards received in the boxes $23b$-$23e$. In other words, the discharge time point of the card in the box $23a$ is determined on the basis of the sum of the set time periods T2-T5: $\{(-3)+(+2)+(0)+(-1)+(+4)=2\}$, i.e., the card is discharged two seconds later.

Similarly, the card in the box $23b$ is discharged one second (=the sum of the set time periods T2, T3 and $T4=(-1)+(0)+(+2)$) later, in consideration of the cards in the boxes $23c$ and $23d$.

The card in the box $23d$ is discharged two seconds {= the sum of the set time periods T4 and $T3=(+2)+(0)$} later, in consideration of the card in the box $23c$.

The card in the box $23e$ is discharged five seconds {= the sum of the set time periods T2, T3, T4 and $-T5=(+4)+(0)+(+2)+(-1)$} later, in consideration of the cards in the boxes $23b$-$23d$.

Accordingly, as is shown in FIG. 9, the card in the box $23b$ is discharged one second later than the card in the box $23c$, the cards in the boxes $23a$ and $23e$ are discharged two seconds later than the same card, and the card in the box $23e$ is discharged five seconds later than the same card.

Figure 8A:
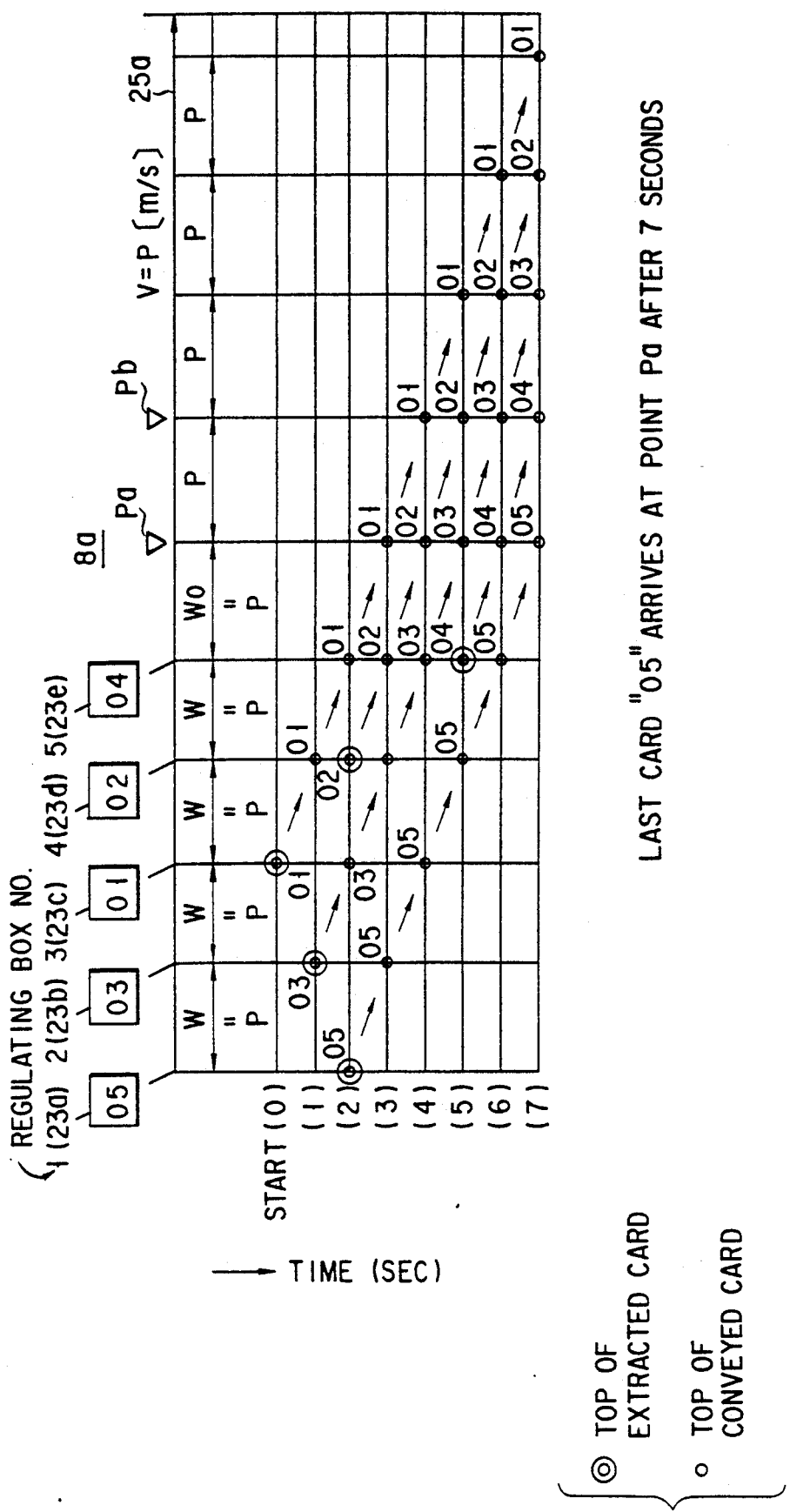
FIGS. 8A and 8B show views, useful in explaining a specific mail-rearrangement control and conventional control, respectively.
Figure 8B:
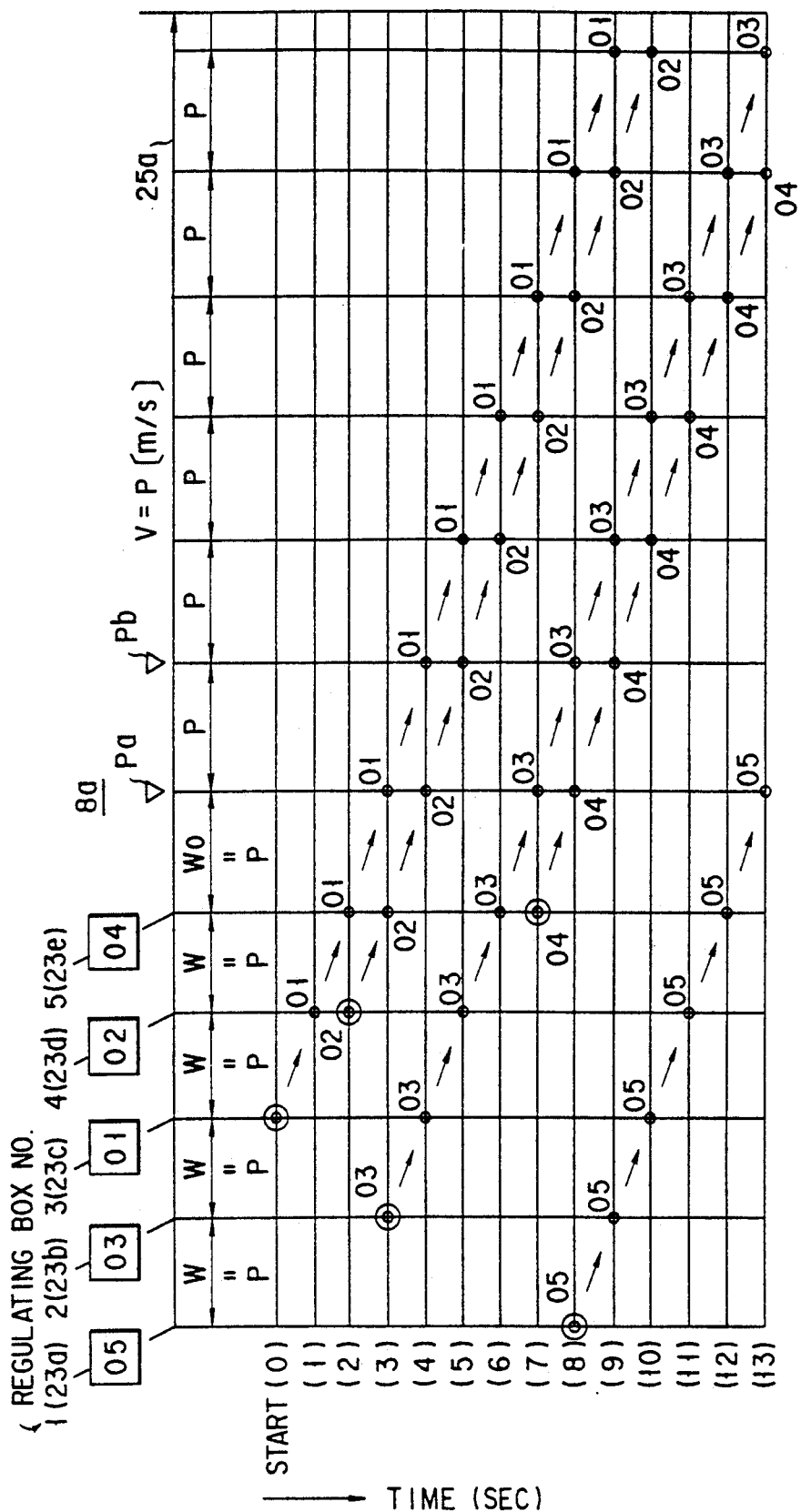

As a result, the cards discharged from the boxes $23a$, ..., $23n$ of the regulating box group $8a$ are transferred with a constant pitch of P along the exit transfer passage $25a$, and then collected in the collecting section $9a$. In the section $9a$, the cards are arranged in order (e.g. in the order of the cards discharged from the boxes $23c$, $23d$, $23b$, $23e$, and $23a$). FIG. 8A shows a timing chart in which cards 01-05 are taken out from regulating boxes $23a$-$23e$ and rearranged in order. As shown in FIG. 8A, the last card 05 arrives at point Pa seven seconds after the operation starts. The cards are conveyed at a constant pitch. On the contrary, as shown in FIG. 8B, it takes 13 seconds after the operation starts in the conventional simple control. Therefore, according to the present invention, it is possible to rearrange cards in order in a very short time.

Similarly, the cards received in the regulating box groups $8b$, ..., $8n$ are rearranged in accordance with the numbers thereof, and collected in the collecting sections $9b$, ..., $9n$.

In the above described embodiment, several simplicities are taken for the ease of an explanation. Since the box pitch W and the transfer speed V can be set at any desired values, it is possible to transfer cards at a constant pitch with high speed, even if the boxes are arranged at very high density.

As is described above, in the handling apparatus of the invention, data items on sheets of paper such as postal cards are read by a reading section while they are transferred, the cards are sorted into regulating box groups in accordance with read data items and then one by one received in regulating boxes in each group, and the cards are discharged from the boxes in the order of read data items indicative of their numbers and then collected serially in each group.

This structure does not limit physically the supply amount of cards. Further, additional supply of cards can be performed unless all the regulating boxes are not filled with cards. Rearrangement of cards can be performed simultaneously in all the regulating box groups, so that the time period required to the rearrangement is not long. In addition, since the required handling time period can be estimated, it is possible to supply cards additionally into the regulating box groups by estimating the time required for handling the additional cards.

Moreover, since cards are discharged and collected only two times, respectively, irrespective of the number of cards, they will not be damaged badly. Since cards are fed into and discharged from each regulating box one by one, no particular devices are necessary to prevent handling of two cards at a time. In other words, since each of discharging and collecting operations which may give cards stress is performed only once, the cards may be handled without undergoing damages.

Furthermore, since the time period required to rearrange cards is controlled to an optimal value, it is shorter than that required to perform the conventional simple discharge. It is not necessary to use an end card as a mark for rearrangement, as in the conventional case, and hence it is easy to increase regulating box groups in future.

As is explained above, the present invention can provide a paper-sheet handling apparatus capable of handling paper sheets with data items indicative of a predetermined group and of their turns in each group, so as to arrange the paper sheets in order in each group.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A paper-sheet handling apparatus for handling paper sheets each of which has group data indicative of a group to which the sheet belongs, and order data relating to the turn of the sheet in the group, comprising:

supply means for supplying the sheets one by one;

transfer means for transferring the paper sheets supplied by the supply means one by one;

reading means for reading the group data and order data of each sheet transferred by the transfer means;

a plurality of regulating box groups arranged in parallel with the transfer means, each of the regulating box groups having a plurality of regulating boxes;

sorting means for sorting each of the paper sheets transferred by the transfer means, into that one of the regulating box groups which corresponds to the group data read by the reading means;

delivery means provided at each regulating box group, for one-by-one delivering the paper sheets sorted by the sorting means, into the regulating boxes;

discharge means, for discharging the paper sheets received in the regulating boxes, in accordance with the relative positions of the paper sheets and the order data items read by the reading means; and a plurality of collecting means each for collecting the paper sheets, discharged by the discharge means from a corresponding regulating box group, in an order determined by the order data in the regulating box group.

2. The apparatus according to claim 1, wherein the discharge means includes exit transfer passages for discharging the paper sheets from the regulating boxes, and a time table for prestoring data on a transfer time period corresponding to the distance between each regulating box and a reference point of a corresponding exit transfer passage.

3. The apparatus according to claim 1, wherein said discharge means includes memory means for storing the data read by the reading means, time table for storing transfer time period data corresponding to the distance between each regulating box and a reference point of a corresponding exit transfer passage, and control means for computing a discharging order from data stored in the memory means and time table so as to send driving signals to the delivery means.

4. A paper-sheet handling apparatus for handling cards each of which has group data indicative of a group to which the card belongs, and order data relative to the turn of the card in the group, comprising:

transfer means for transferring the cards one by one;

reading means for reading the group data and order data of each card;

a memory for storing the read group data and order data;

a plurality of regulating box groups corresponding to the read group data items;

sorting means for sorting each of the cards into that one of the regulating box groups which corresponds to the group data read by the reading means;

delivery means for delivering the sorted cards one by one into a plurality of regulating boxes; and means for causing the memory to store data on the relation between a regulating box containing a card and the turn of the card.

5. A paper-sheet handling apparatus comprising:

transfer means for transferring a plurality of paper sheets, each of which has turn data indicative of a turn of the sheet;

reading means for reading the turn data of each sheet transferred by the transfer means;

a plurality of aligned regulating boxes arranged after the transfer means;

delivery means for one-by-one delivering the paper sheets into the respective regulating boxes;

discharge means for discharging the paper sheets received in the regulating boxes;

exit transfer passages for transferring the paper sheets discharged from the regulating boxes;

a plurality of collecting means each for collecting the paper sheets, discharged by the discharge means from a corresponding regulating box group, in an order determined by the turn data;

memory means for prestoring data on a transfer time period corresponding to the distance between each regulating box and a reference point of a corresponding exit transfer passage; and control means for controlling a discharging time of the discharge means according to the turn data read by the reading means and the transfer time period stored in the memory means.

* * * * *